Figures 1, 2:
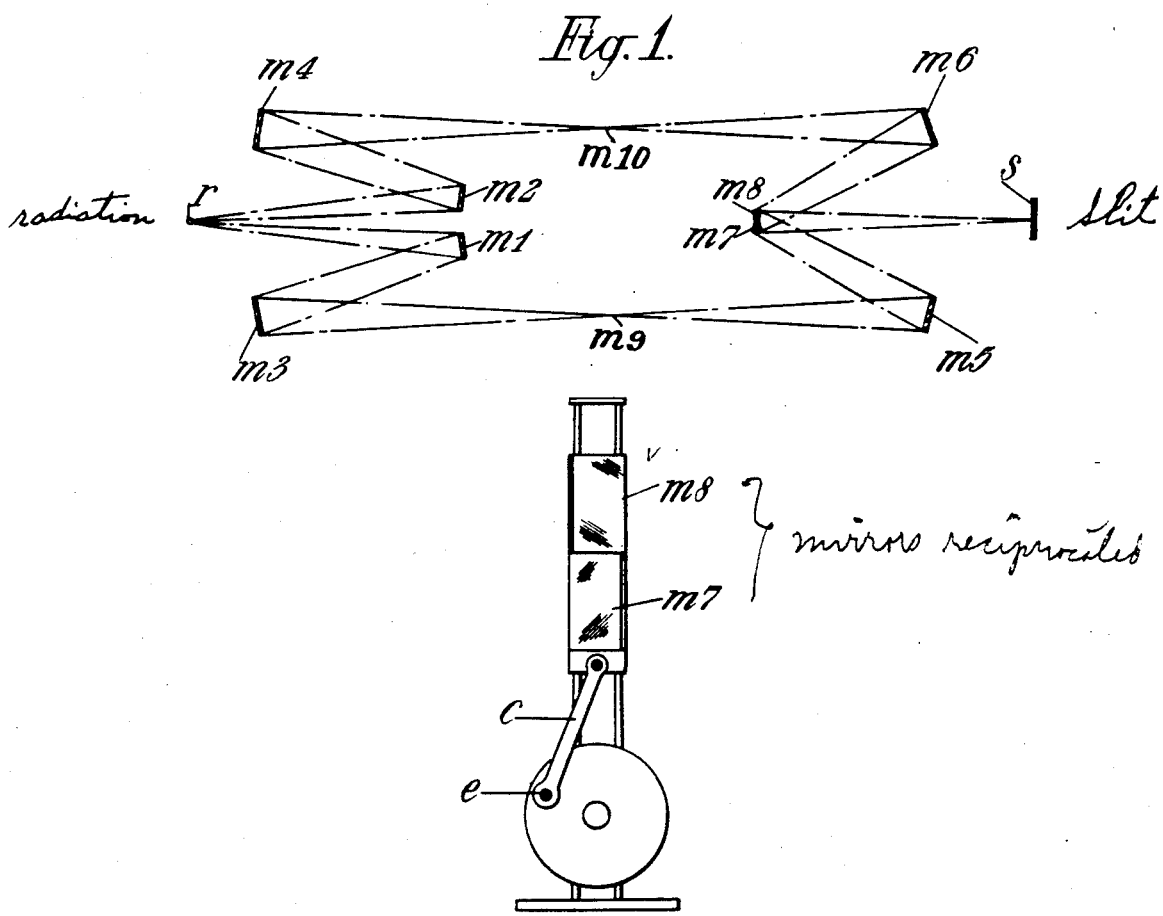

July 29, 1952   L. S. BACKHOUSE   2,604,810
DOUBLE-BEAM OPTICAL SYSTEM APPLICABLE TO
SPECTROMETERS AND OTHER INSTRUMENTS
Filed March 17, 1950

INVENTOR.

Patented July 29, 1952

2,604,810

UNITED STATES PATENT OFFICE 2,604,810

DOUBLE-BEAM OPTICAL SYSTEM APPLICABLE TO SPECTROMETERS AND OTHER INSTRUMENTS

Leonard S. Backhouse, Newcastle-upon-Tyne, England, assignor to C. A. Parsons & Company Limited, Newcastle-upon-Tyne, England Application March 17, 1950, Serial No. 150,302
In Great Britain March 22, 1949

3 Claims. (Cl. 88—14)

This invention relates to spectrometers and other optical instruments of the kind in which radiation from a suitable source, such as a Nernst filament, is switched a number of times a second alternately by way of two beam paths, one including a sample and the other including a blank, before entering the slit of the instrument.

The invention is particularly, though not exclusively, applicable to double-beam infra-red spectrometers.

Double-beam spectrometers are known to have many advantages over single-beam instruments, the most important being that a record is obtained relating percentage transmission to wavelength instead of curves giving the energy variation from the radiation source, before and after transmission through a sample, as a function of wavelength.

If such a spectrometer is set to a wavelength at which a sample has appreciable absorption, the radiation finally falling on the detecting element in the spectrometer will fluctuate as the beam is switched from one path to the other and an A. C. component will be contained in the output from the detector. This A. C. signal may be amplified by known means and the output current used to control the position of a variable aperture which can be introduced into the blank beam. The position of this variable aperture may be altered automatically until equality between the two beams at the particular wavelength in question is established, at which point the A. C. signal from the detector falls to zero and the variable aperture then remains stationary. The position of this aperture gives a direct measure of the percentage transmission of the sample and by linking it to a recording pen a convenient means of providing a record of the spectral transmission of the sample is provided.

The object of the present invention is to provide improved means of obtaining double-beam operation.

The invention consists in an optical system for use with spectrometers and other instruments of the kind set forth incorporating features as set forth in the claims appended hereto.

In the accompanying diagrammatic drawings, Figure 1 illustrates one convenient form of optical system embodying the present invention, and Figure 2 illustrates a convenient form of reciprocating mirror apparatus that may be used therein.

In carrying the invention into effect in one form illustrated in Figures 1 and 2 as applied to a double-beam spectrometer, a source of radiation $r$ (Figure 1) is provided, radiations from which are intercepted by two plane mirrors $m_1$ $m_2$ mutually spaced apart. The reflected radiations from these mirrors strike concave mirrors $m_3$ $m_4$ respectively, whence they are reflected on to two further concave mirrors $m_5$ $m_6$ respectively.

The radiations reflected by the latter mirrors strike two rectangular plane mirrors $m_7$ $m_8$ alternately whence the radiations are directed through the slit S of a spectrometer (not shown). The mirrors $m_7$ $m_8$ are adapted to be reciprocated.

The reciprocating action may be conveniently obtained from a small synchronous motor with a driving disc $e$ and connecting rod $c$ (Figure 2), the mirrors $m_7$ $m_8$ being suitably mounted in a light frame and constrained by guides to move up and down in a straight line. The throw is sufficient for each mirror in turn to accept the whole of the radiation from $m_5$ or $m_6$. The sample which may be gas or liquid in a suitable cell, or a solid film, is placed in one of the radiation paths, while an empty cell, in the case of a gas or liquid, is placed in the other path.

Advantages that may be attained by systems embodying the present invention are:

(1) A small space occupied by reciprocating mirrors as compared with the rotating cut-away mirror which has been used previously for the same purpose.

(2) A compact arrangement made possible by using reciprocating mirrors. With this arrangement the source of radiation is at one end of the equipment and the dissipation of the large amount of heat produced is more readily accomplished.

(3) Primary foci are available (e. g. at $m_9$, $m_{10}$, Figure 1) so that cells of small aperture can be used. This is a practical advantage owing to the high cost of large plates of rocksalt and other transparent materials.

(4) The two optical paths are strictly equivalent with the same number of reflecting surfaces present in each and the same actual path length.

(5) The radiation in each path may come very nearly from the same surface of the radiation source. This is advisable since the emission characteristics may not be quite the same for opposite sides of the source.

I claim:

1. In an optical system in which radiation from a radiating source is alternately projected through a slit by a path traversing a sample and by a path traversing a blank, and in combination, optical elements for projecting radiation from a radiating source through a slit along two separate paths, the paths being coincident and parallel at the slit, and comprising a pair of mirrors, means rigidly joining the mirrors of the said pair together, means mounting the pair of mirrors for reciprocation between two positions, the said mirrors being arranged with respect to the other optical elements to reflect radiation through the slit from one of the said paths but not the other when the pair of mirrors is in one of the said positions, and the said mirrors being arranged to reflect radiation through the slit from the other of the said paths but not the first mentioned path, when the pair of mirrors is in the other said position, and means for reciprocating the said pair of mirrors between the two said positions.

2. The combination according to claim 1, in which the mirrors of the said pair have plane reflecting surfaces.

3. The combination according to claim 1, in which the optical elements for the two paths comprise elements for focusing the radiation at primary foci in the two paths whereby sample and blank cells of small aperture may be utilized by placing them at the said primary foci.

LEONARD S. BACKHOUSE.

REFERENCES CITED

The following references are of record in the file of this patent:

UNITED STATES PATENTS

| Number | Name | Date |
|---|---|---|
| 1,746,525 | Darrah | Feb. 11, 1930 |
| 1,854,132 | Ginsberg | Apr. 12, 1932 |
| 1,999,023 | Sharp et al. | Apr. 23, 1935 |
| 2,458,973 | Barnes | Jan. 11, 1949 |
| 2,503,165 | Meyer | Apr. 4, 1950 |

FOREIGN PATENTS

| Number | Country | Date |
|---|---|---|
| 680,307 | Germany | Aug. 26, 1939 |
| 555,408 | Great Britain | Aug. 23, 1943 |
| 584,506 | Great Britain | Jan. 16, 1947 |

OTHER REFERENCES

Journal of the Optical Society of America, vol. 37, March 1947, pages 212 and 213, article by Wright et al., "Infra-Red Spectraphotometer."